Figure 1:

Patented Aug. 12, 1952

2,606,851

UNITED STATES PATENT OFFICE 2,606,851

PHONOGRAPH RECORD AND METHOD OF MANUFACTURE

Eugene D. O'Mahony and George P. Humfeld, Indianapolis, Ind., assignors to Radio Corporation of America, a corporation of Delaware Application November 12, 1948, Serial No. 59,778

12 Claims. (Cl. 154—43)

1

This invention relates generally to an improved process for making solid core laminated sound records and to the improved articles thus produced. More particularly, the invention relates to an improved phonograph record having a core made of sheeted paper pulp impregnated with zein, or zein and a particular resin material.

Heretofore, articles have been molded from kraft paper or paper board impregnated with zein-"Vinsol" compositions. Zein is a corn protein produced commercially by extracting gluten meal with isopropyl alcohol. "Vinsol" (registered trade-mark) is the substantially gasoline insoluble, aromatic hydrocarbon soluble resinous extract of pinewood.

Phonograph records of the laminated type have previously been made using a thermoplastic core material molded between two surface sheets of kraft paper onto which a resinous surfacing compound has been dusted. This type of record, however, has shown such disadvantages as breaking when flexed, weak and brittle edges, splitting of the edges by record changers, and a serious problem of the kraft paper surface sheets tearing during molding.

The improved core material of the present invention overcomes all of these disadvantages previously associated with the above described types of laminated records and, in addition, results in the production of greatly improved phonograph records which are tough and have excellent wearing qualities with low surface noise.

One object of the present invention is to provide an improved process for manufacturing high quality phonograph records using a minimum amount of expensive, high quality resins for surfacing material and a relatively large amount of cheap but strong inner core material.

Another object of the invention is to provide an improved product comprising a phonograph record having a felted fibrous core impregnated with thermoplastic material and having surfaces of a different thermoplastic resinous material.

Another object of the invention is to provide phonograph records having improved qualities with respect to weight, flexibility, edging and durability, which are, at the same time, moderate in cost.

Another object of the invention is to provide an improved phonograph record of the flexible substantially nonbreakable type.

Another object of the invention is to provide improved phonograph records of the laminated type having edges that will resist chipping or cracking and which will not split when used with conventional knife-edge record changers.

2

Another object of the present invention is to provide an improved record of the laminated type having its edges completely formed during the molding process and requiring substantially no further aftertreatment to remove the flash.

Still another object of the invention is to provide an improved record of the laminated type having improved resistance to warpage.

These and other objects will be more apparent and the invention will be more readily understood from the following specification and the illustrative drawing. Examples included in this specification are intended to be illustrative, only, and the scope of the invention will be indicated by the appended claims.

Figure 2:
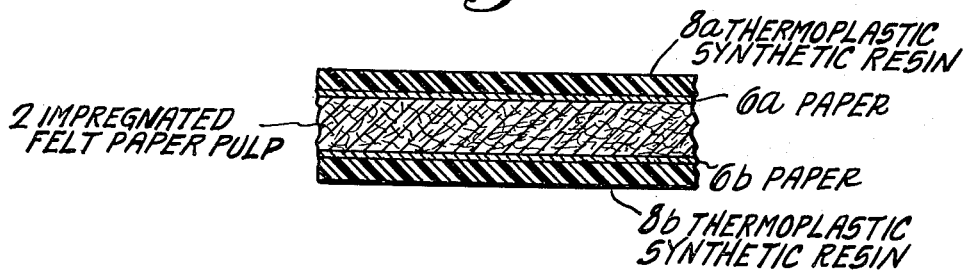

Figure 1 is a diagrammatic partial section view of one embodiment of molded phonograph record in accordance with the present invention, and Figure 2 is a view similar to that of Figure 1 of another embodiment of molded phonograph record in accordance with the present invention.

Referring first to Figure 1, one type of improved disc phonograph record in accordance with the present invention comprises a core 2 of compressed felted paper pulp impregnated with zein or zein and certain resinous materials which will be more particularly described hereinafter, and having surface coatings 4a and 4b of thermoplastic synthetic resinous materials which will also be more particularly described.

Another embodiment of disc record in accordance with the present invention is shown in Figure 2. This embodiment comprises an impregnated felted paper core 2 as in the embodiment of Figure 1, sheets of Kraft paper 6a and 6b adhering to the faces of the core, and surface coatings 8a and 8b of synthetic resinous materials on the outer face of each of the paper sheets.

The core material which it is preferred to use for making the improved phonograph records of the present invention is sheeted paper pulp. Preferably, the sheet is thoroughly dried so that it contains a minimum amount of moisture. Although paper pulp of a high degree of purity is preferred, it is also possible to use almost any commercial grade of paper pulp containing the usual impurities such as lignin or other natural resins which are not completely removed during the paper making process.

In general, the process comprises impregnating paper pulp with a solution or dispersion of zein, to which may be added either rosin or "Vinsol" as an extender. However, the zein may be used without the extender resins. The zein, or zein-resin composition, may be added to the pulp after it is in felted sheet form or it may be added to the paper pulp as the pulp is processed in the beater and before it is formed into sheets. The impregnated sheet is dried and then a surfacing material is applied. The surfacing material may comprise a sheet of kraft paper carrying a coating of resinous material. Preferably, the resinous coating is in the form of a fine powder which has been softened sufficiently to enable it to adhere to the paper sheet. Alternatively, the powdered resin may be applied directly to the surfaces of the core material, although this method is less desirable than the one which utilizes paper sheets to hold the resin powder. More specific examples of processes for preparing the improved articles of the present invention will now be described:

Example 1

A sheet of felted paper pulp, thoroughly dried and .120" in thickness, was impregnated with a composition comprising 12.5 to 66.5 parts zein and 100 parts isopropyl alcohol. The impregnated sheet was dried to remove the volatile solvent. A disc of desired diameter was cut from the impregnated sheet and surfacing material applied as follows: A sheet of kraft paper having a circular form and a diameter slightly larger than the diameter of the impregnated sheet was covered with finely powdered, fused vinyl chloride-vinyl acetate copolymer resin containing 85–88% polyvinyl chloride, and the thus treated paper disc was then heated sufficiently to soften the resinous particles in order to cause them to adhere to the paper sheet. This was then passed beneath calendering rolls to increase adhesion. A second disc of kraft paper was prepared in an exactly similar manner.

A molding assembly was then made by assembling the core sheet between two surface sheets and this "sandwich" was then molded under heat and pressure in the conventional manner of molding disc phonograph records. The product has desirable properties of good flexibility, toughness, a lack of brittleness, good wearing qualities, and low surface noise characteristic of high quality disc phonograph records. As previously pointed out, it also has edge characteristics greatly improved over the usual type of laminated phonograph record heretofore manufactured.

Example 2

A sheet of compressed paper pulp was impregnated, as described in Example 1, with a composition comprising zein 12.5 to 33.3 parts, "Vinsol" resin or rosin 12.5 to 33.3 parts, and isopropyl alcohol 100 parts. The impregnated sheet was then processed as described in Example 1, assembled with surface sheets prepared as previously described, and finally molded into a phonograph record.

Example 3

Another type of composition for impregnating the core material is:

| | Parts |
|---|---|
| Zein | 12.5 to 50 |
| "Vinsol" resin or rosin | 12.5 to 50 |
| Oleic acid | 1 to 5 |
| Methyl alcohol | 100 |

The oleic acid serves as a plasticizer which improves the flexibility of the product.

Example 4

Instead of utilizing a solution of the impregnating material, a water dispersion may be formed as follows:

| | Parts |
|---|---|
| Zein | 95 |
| Rosin | 20 |
| Oleic acid | 10 |
| Water | 475 |
| Aqueous ammonia (28%) | 10 |

In the presence of the ammonia or other weak alkali, the rosin saponifies and, thus, forms a medium for dispersing the zein. Impregnation of the paper pulp sheet takes place as described in the previous examples and the remainder of the process of preparing a disc phonograph record is the same as described above. Instead of forming the sheet of paper pulp first and then impregnating with one of the above compositions, the impregnate may be added to the pulp as the latter is being processed in the beater before being calendered into sheets. Regardless of which type of impregnating process is used, a total resin content comprising either zein, alone, or zein-"Vinsol," or zein-rosin of 10 to 40% compared to the weight of the paper pulp has produced satisfactory core material. It will be noted that any amount of the zein up to as much as one-half may be replaced with either the "Vinsol" or the rosin.

Zein has proven to be an excellent binder in making the products described due to its superior cold flow resistance, its toughness, and its contributing to increasing the flexural strength of the laminated structure. It, also, has good adhesive properties and, with the addition of a small quantity of plasticizer such as a fatty acid or a glycol, the material is less brittle than most of the impregnating materials heretofore used. Moreover, unlike materials such as "Vinsol," alone, or asphalt, when softened in the record press, volatilization of entrapped gases does not occur to form blisters. Another advantage of using zein for impregnating a record core material is that zein is a thermoplastic material and can, therefore, be reworked and the scrap re-used which, of course, makes the entire process more economical.

Although vinyl chloride-vinyl acetate copolymers having 85–88% polyvinyl chloride have been used as the preferred example of surfacing material because of their excellent wearing qualities and low surface noise properties, it is possible to use almost any other conventional resinous surfacing material known to the record industry. Examples of other surfacing materials are compositions comprising ethyl cellulose or ethyl cellulose modified with low melting point resins such as "Vinsol," or polyvinyl acetal resins which may or may not be modified with softer, low melting point resins, or the methacrylate polymers or copolymers of polymethyl methacrylate and styrene. These examples are not intended to be limiting but are given only as illustrations of many possible types well known to phonograph record manufacturers and other plastics molding manufacturers. Since the amount needed per record is relatively small, the unfilled type of composition may be used with consequent reduction in surface noise.

We claim as our invention:

1. A phonograph record comprising a molded, disc shaped core made of felted paper pulp impregnated with zein and having surfaces comprising coatings of a thermoplastic resinous material selected from the class consisting of ethyl cellulose and copolymers of vinyl chloride-vinyl acetate containing 85–88% polyvinyl chloride, said surfaces having sound tracks thereon.

2. A record according to claim 1 in which the impregnating material includes also a resinous material from the class consisting of rosin and the substantially gasoline insoluble, aromatic hydrocarbon soluble resinous extract of pinewood.

3. A process of making a phonograph record comprising forming a core of felted paper pulp impregnated with a composition comprising zein, providing said core with sound track carrying surfaces of powdered thermoplastic resinous material selected from the class consisting of ethyl cellulose and copolymers of vinyl chloride-vinyl acetate containing 85–88% polyvinyl chloride and subjecting said surfaced core to a molding process which includes the application of heat and pressure.

4. A process according to claim 4 in which said impregnation is carried out by adding said composition to the pulp in the beater before it is formed into a sheet.

5. A process according to claim 4 in which said core composition includes also a resin from the class consisting of rosin and the substantially gasoline insoluble, aromatic hydrocarbon soluble resinous extract of pinewood.

6. A process according to claim 4 in which said composition contains the impregnating solids in dissolved form.

7. A process according to claim 3 in which said composition contains the impregnating solids in the form of a suspension.

8. A phonograph record comprising a core of felted paper pulp impregnated with a composition comprising at least 50% zein by weight and having a surface formed of a sheet of paper coated with a thermoplastic resinous material selected from the class consisting of ethyl cellulose and copolymers of vinyl chloride-vinyl acetate containing 85–88% polyvinyl chloride.

9. A process of making a phonograph record comprising forming a core of felted paper pulp impregnated with a composition comprising at least 50% zein by weight, providing said core with a sound track carrying surface by placing thereon a sheet of paper coated with a powdered thermoplastic resinous material selected from the class consisting of ethyl cellulose and copolymers of vinyl chloride-vinyl acetate containing 85–88% polyvinyl chloride and subjecting the core and said coated sheet to a molding process which includes the application of heat and pressure.

10. A phonograph disc record comprising a core of felted paper pulp impregnated with from 10 to 40 percent by weight of zein and having a surface formed of a sheet of paper coated with a thermoplastic resinous material selected from the class consisting of ethyl cellulose and copolymers of vinyl chloride-vinyl acetate containing 85–88% polyvinyl chloride, said surface having a sound groove thereon.

11. A phonograph disc record comprising a core of felted paper pulp impregnated with from 10 to 40 percent by weight of equal parts by weight of zein and a material from the class consisting of rosin and the gasoline insoluble, aromatic hydrocarbon soluble resinous extract of pinewood, said core having a surface formed of a sheet of paper coated with a thermoplastic resinous material selected from the class consisting of ethyl cellulose and copolymers of vinyl chloride-vinyl acetate containing 85–88% polyvinyl chloride, and said surface having a sound groove thereon.

12. A phonograph disc record comprising a core of felted paper pulp impregnated with from 10 to 40 percent by weight of a composition comprising zein, up to 50 percent by weight of a material from the class consisting of rosin and the gasoline insoluble, aromatic hydrocarbon soluble resinous extract of pinewood, and a minor percentage of a fatty acid plasticizer, said core having a surface formed of a sheet of paper coated with a thermoplastic resinous material selected from the class consisting of ethyl cellulose and copolymers of vinyl chloride-vinyl acetate containing 85–88% polyvinyl chloride, and said surface having a sound groove thereon.

EUGENE D. O'MAHONY.
GEORGE P. HUMFELD.

REFERENCES CITED

The following references are of record in the file of this patent:

UNITED STATES PATENTS

| Number | Name | Date |
| --- | --- | --- |
| 1,083,264 | Baekeland | Dec. 30, 1913 |
| 1,954,026 | Schneider | Apr. 10, 1934 |
| 1,966,856 | Groff | July 17, 1934 |
| 1,994,093 | Billings | Mar. 12, 1935 |
| 2,094,613 | McBurney | Oct. 5, 1937 |
| 2,284,091 | Hunter | May 26, 1942 |
| 2,377,237 | James | May 29, 1945 |
| 2,385,722 | Navikas | Sept. 25, 1945 |